Sept. 27, 1966 R. A. SCHATZ 3,275,929
ELECTRONIC LOAD TAP CHANGER SYSTEMS
Filed June 12, 1963

WITNESSES
Theodore T. Wrobel
James T. Young

INVENTOR
Robert A. Schatz
BY Donald R. Lackey
ATTORNEY

United States Patent Office 3,275,929
Patented Sept. 27, 1966

3,275,929
ELECTRONIC LOAD TAP CHANGER SYSTEMS
Robert A. Schatz, Sharon, Pa., assignor to Westinghouse Electric Corporation, East Pittsburgh, Pa., a corporation of Pennsylvania
Filed June 12, 1963, Ser. No. 287,260
6 Claims. (Cl. 323—43.5)

This invention relates in general to electrical control apparatus and more particularly to electronic load tap changer systems and regulator circuits.

Electronic load tap changer systems of the prior art, such as used in regulator circuits, generally require two electrical valves per tap, per electrical phase. One electrical valve is required for the positive voltage half cycle and one electrical valve is required for the negative voltage half cycle. Therefore, in a two tap system, four electrical valves would be required, along with the associated power supplies and firing circuits for each of the electrical valves.

It would be highly desirable from an economic viewpoint to reduce the number of electrical valves required per tap, per electrical phase, to one. The initial cost of the tap changing system would be reduced accordingly, along with reduction in physical size of the equipment.

Accordingly, it is an object of this invention to provide a new and improved electrical control apparatus.

Another object of this invention is to provide a new and improved regulator system for maintaining an average electrical quantity at a predetermined magnitude.

Another object of the invention is to provide a new and improved load tap changing system.

A further object of the invention is to provide a new and improved electronic load tap changer system that requires only one electrical valve per tap, per electrical phase.

Another object of the invention is to provide a new and improved electronic load tap changer system that utilizes one electrical valve per tap, per electrical phase, with the single electrical valve switching during both the positive and negative voltage half-cycles.

Briefly, the present invention accomplishes the above cited objects by providing an electronic tap changing system in which each tap has one electrical valve connected across a bridge rectifier arrangement, with the electrical valve always being poled in the conducting direction regardless of the polarity of the source of the electrical potential. More particularly, each tap of the electrical source, such as electrical inductive apparatus, is connected to one of the terminals normally considered an alternating current input terminal on a conventional single phase, bridge type rectifier. The other alternating current input terminal is connected to the load circuit. An electrical valve, such as an ignitron tube or semiconductor controlled rectifier is connected between the terminals normally considered the unidirectional output voltage terminals of the bridge rectifier, with the anode electrode of the electrical valve being connected to the positive terminal of the bridge rectifier, and the cathode electrode of the electrical valve being connected to the negative terminal. Therefore, the polarity across the electrical valve will always be such that the electrical valve will conduct current, upon receiving a proper excitation signal, during either the positive or negative voltage half cycles. By arranging the tap system so that the electrical valve associated with the lower voltage tap is fired at the start of the voltage half cycle, the firing of the electrical valve associated with a higher voltage tap later during the half cycle will automatically cause the electrical valve associated with the lower voltage tap to cease conduction. Thus, a desired electrical quantity, such as voltage or current, may be regulated by firing the electrical valve associated with the lower voltage tap at the start of the positive and negative voltage half cycles, and firing the electrical valve associated with the higher voltage tap at the point during the half cycle determined by the associated firing control circuits.

Further objects and advantages will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
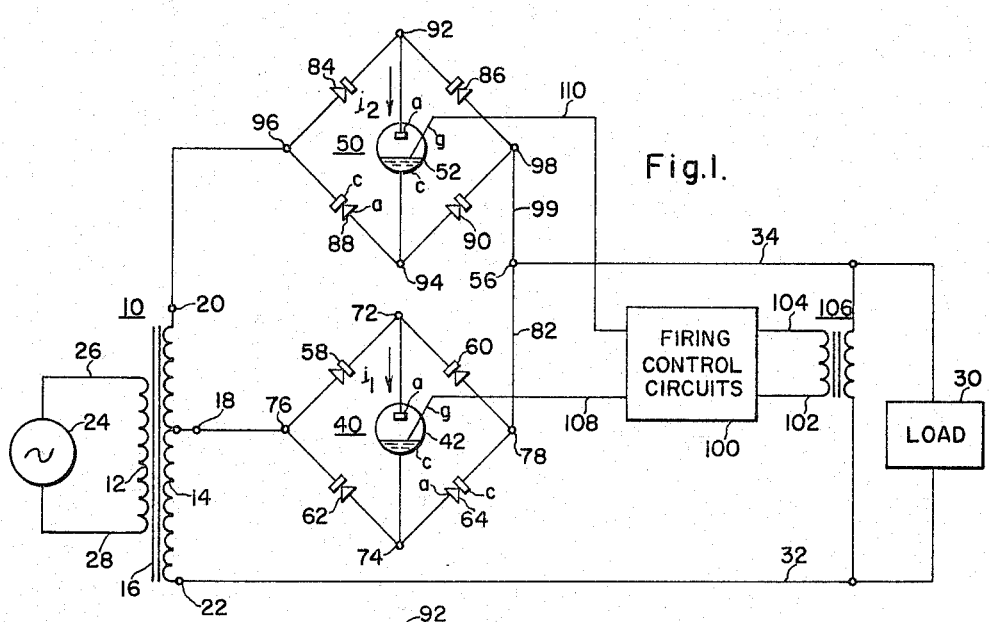
FIGURE 1 is a schematic diagram illustrating one embodiment of the invention.

Referring now to the drawings, and FIG. 1 in particular, there is shown an electrical inductive device or transformer 10 having windings 12 and 14 inductively disposed on magnetic core 16. Winding 14 of transformer 10 has a tap connection 18 suitably disposed at a predetermined electrical point between the ends 20 and 22 of winding 14. Winding 10 is connected to a source of alternating potential 24 through line conductors 26 and 28.

Winding 14 of transformer 10 is disposed to supply electrical energy to load circuit 30, with terminal 22 of winding 14 being connected to load circuit 30 through line conductor 32. In order to control an electrical quantity, such as voltage or current, being applied to load circuit 30 by winding 14 of transformer 10, the remaining connection to load circuit 30 from winding 14 as accomplished through tap connection 18 and end terminal 20 of winding 14. Tap connection 18 is connected to load circuit 30 through bridge rectifier 40, electrical valve 42, which may be an ignitron type rectifier, and line conductor 34. End terminal 20 of transformer 10 is connected to load circuit 30 through bridge rectifier 50, electrical valve 52, which may be an ignitron type rectifier, and the line conductor 34. Bridge rectifiers 40 and 50 connect to line conductor 34 at common point 56.

More specifically, bridge rectifier 40 includes rectifier devices 58, 60, 62, and 64, which may be semiconductor diode type rectifiers each having a cathode $c$ and an anode $a$. Semiconductor diodes 58, 60, 62 and 64 are connected in bridge arrangement, with the cathode electrodes of semiconductor diodes 58 and 60 being connected together at terminal 72, the anode electrodes of semiconductor diodes 62 and 64 being connected together at terminal 74, the cathode of semiconductor diode 62 being connected to the anode of semiconductor diode 58 at terminal 76, and the cathode of semiconductor diode 64 being connected to the anode of semiconductor diode 60 at terminal 78.

The electrical valve or ignitron rectifier 42, which has a cathode electrode $c$, an anode electrode $a$ and a control electrode $g$, is connected between terminals 72 and 74 of bridge rectifier 40, with the anode electrode $a$ being connected to terminal 72 and the cathode electrode $c$ being connected to terminal 74.

Tap connection 18 of winding 14 is connected to terminal 76 of bridge rectifier 40, and the circuit is completed from winding 14 of transformer 10 to load circuit 30, by connecting terminal 78 of bridge rectifier 40 to line 34 at point 56, through conductor 82. Therefore, on the positive half cycle of voltage, current can flow from tap connection 18 of winding 14, through diode 58, through ignitron rectifier 42 in the direction indicated by the arrow $i_1$, through diode 64, through load circuit 30, and back to winding 14 at terminal connection 22. On the negative half cycle of voltage, current can flow from tap connection 22 of winding 14, through load circuit 30, through diode 60, through ignitron rectifier 42 in the direction indicated by the arrow $i_1$, through diode 62, and back to winding 14 at tap connection 18. It will be noted that the polarity of the voltage applied to ignitron rectifier 42 is always such that the current will tend to flow through the ignitron tub 42 in the direction indicated by the arrow $i_1$. This is true whether or not the voltage source 24 is in the positive or negative alternation.

The remaining connection from winding 14 of transformer 10 to load circuit 30 is accomplished through bridge rectifier 50. Bridge rectifier 50 includes rectifier devices 84, 86, 88 and 90, which may be semiconductor diode type rectifiers each having a cathode electrode $c$ and an anode electrode $a$. Similar to bridge rectifier 40, semiconductor diodes 84, 86, 88 and 90 are connected in bridge arrangement, with the cathode electrodes of diodes 84 and 86 being connected together at terminal 92, the anode electrodes of diodes 88 and 90 being connected together at terminal 94, the cathode electrode of diode 88 being connected to the anode electrode of diode 84 at terminal 96, and the cathode electrode of diode 90 being connected to the anode electrode of diode 86 at terminal 98.

The electrical valve or ignition rectifier 52, which has a cathode electrode $c$ and an anode electrode $a$, as well as a control electrode $g$, is connected between terminals 92 and 94 of bridge rectifier 50, with the anode electrode $a$ being connected to terminal 92 and the cathode electrode $c$ being connected to terminal 94.

Terminal connection 20 of winding 14 is connected to terminal 96 of bridge rectifier 50, and the circuit is completed from winding 14 of transformer 10 to the load circuit 30, by connecting terminal 98 of bridge rectifier 40 to conductor 34 at junction 56, through conductor 99. Therefore, on the positive half cycle of voltage, current can flow from terminal connection 20 of winding 14, through diode 84, through ignitron rectifier 52 in the direction indicated by the arrow $i_2$, through diode 90, through load circuit 30, and back to winding 14 at terminal connection 22. On the negative half cycle of voltage, current can flow from tap connection 22 of winding 14 through load circuit 30, through diode 86, through ignitron rectifier 52 in the direction indicated by the arrow $i_2$, through diode 88 and back to winding 14 at terminal connection 20. It will be noted that the polarity of the voltage applied to the ignitron rectifier 52 is always such that the current will flow through the ignitron tube 52 in the direction indicated by the arrow $i_2$. This is true whether or not the voltage source 24 is in the positive or negative alternation.

As is well known in the art, an ignitron rectifier is not a free conducting device, but requires a control signal to be applied to an ignitor, which initiates a cathode spot on the cathode of the ignitron. The main anode can then start conduction and cathode spots are maintained by the main anode current during the conducting period of the cycle. When the current of the main anode drops to zero due to current reversal, the cathode spot disappears, and there is no electron emission at the cathode until a cathode spot is initiated by the ignitor to start the conducting period in the next half cycle. This principle of the ignitron is used in this invention, whereby the ignitron 42 is fired at the start of the voltage half cycle, connecting low voltage tap 18 to the load circuit 30, and ignitron 52 is fired at a controlled time later in the same half cycle, to connect high voltage connection 20 to the load circuit 30, thus obtaining any desired root-mean-square (R.M.S.) voltage or current at the load circuit 30 desired, within a predetermined range. The initiation of the firing pulses applied to the ignitor electrodes $g$ of ignitrons 42 and 52 is controlled by firing control circuits 100. Firing control circuits 100 sense the desired electrical quantity at the load circuit 30, such as the load voltage through potential transformer 106 or the load current through current transformers (not shown), through conductors 102 and 104, and applies firing pulses to the ignitor electrodes $g$ of ignitrons 42 and 52 through conductors 108 and 110 at the proper times to maintain the desired electrical quantity. Firing control circuits are well known in the prior art, for example the firing control circuit disclosed in copending application Serial No. 216,659, filed August 13, 1962, and assigned to the same assignee as the present application may be used.

Figure 3:
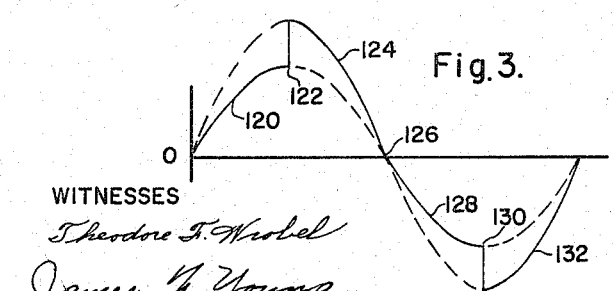
FIG. 3 shows a graph of a typical single phase voltage output waveform produced by the electronic tap changing system disclosed.

In the operation of the circuit illustrated in FIG. 1, reference will be made to the waveform graphically illustrated in FIG. 3. In this instance, the waveform illustrated in FIG. 3 represents the alternating potential applied to the load circuit 30. In operation, the firing control circuits 100 will apply a firing pulse to the ignitor electrode $g$ of ignitron 42 at the start of the voltage half cycle, causing ignitron 42 to conduct current from its anode electrode $a$ to its cathode electrode $c$, connecting tap connection 18 of winding 14 to load circuit 30. Thus, the voltage applied to load circuit 30 will start to increase, following the solid portion of the curve 120 from zero to point 122 as shown in FIG. 3. As hereinbefore described, the current during this period will flow from tap connection 18 of winding 14, through diode 58, ignitron 42, diode 64, load circuit 30, and back to winding 14 at connection 22. At some point, such as point 122 of the voltage half cycle as shown in FIG. 3, the firing control circuit 100 will apply a firing pulse to the ignitor electrode $g$ of ignitron 52, causing ignitron 52 to conduct and connect terminal connection 20 of winding 14 to load circuit 30 through diode 84, ignitron 52 and diode 90. When the ignitron 52 starts to conduct, the voltage applied to load circuit 30 will start to increase. This voltage increase will also be applied to terminal 78 of bridge rectifier 40. When the voltage at terminal 78 reaches a magnitude which produces a voltage difference from terminal 76 to terminal 78 of bridge rectifier 40, across ignitron 42, which is less than the starvation voltage of ignitron 42, or that voltage drop required by the ignitron to maintain the cathode spot, ignitron 40 will stop conducting. Thus, the firing of ignitron 52 automatically causes ignitron 42 to stop conducting. The voltage applied to load circuit 30 for the remaining portion of the positive half cycle is represented by the solid portion of curve 124. At point 126, ignitron 52 will stop conducting, because of insufficient voltage to maintain the cathode spot. Therefore, at point 126, firing circuits 100 will apply a firing pulse to the ignitor electrode $g$ of ignitron 42, causing ignitron 42 to conduct and connect tap connection 18 of winding 14 to load circuit 30 through diode 60, ignitron 42 and diode 62. Due to the bridge arrangement 40, the polarity of the voltage applied to ignitron 42 has not changed, with the anode $a$ of the ignitron 42 still being positive with respect to its cathode $c$. Therefore, the same ignitron tube can be used for tap 18 for both the positive and negative half cycles of voltage. The voltage applied to load circuit 30 through ignitron 42 rises along the solid portion of curve 128 to point 130. At some point, such as point 130, the firing control circuit 100 applies a firing pulse to the ignitor electrode $g$ of ignitron 52, causing ignitron 52 to conduct and connect terminal connection 20 of winding 14 to load circuit 30 through diode 86, ignitron 52 and diode 88. Ignitron 42 is again automatically caused to cease conduction, as hereinbefore described, and the voltage applied to load circuit 30 for the remaining portion of the negative half cycle follows the solid portion of curve 132 to zero voltage. At zero voltage, ignitron 52 ceases conduction and the cycle is ready to repeat itself. Therefore, an average root-mean-square electrical quantity may be maintained at the load by varying the point during a voltage half cycle that a higher voltage tap is connected to the load circuit 30, and the process has been accomplished during both the positive and negative half cycles of voltage, using only one electrical valve per tap connection, or a total of two electrical valves in the case of two tap connections as shown in FIG. 1. Filters and harmonic suppressors for removing undesirable harmonics introduced by the sharp step in the load voltage are well known in the art and are not shown in FIG. 1.

Figure 2:
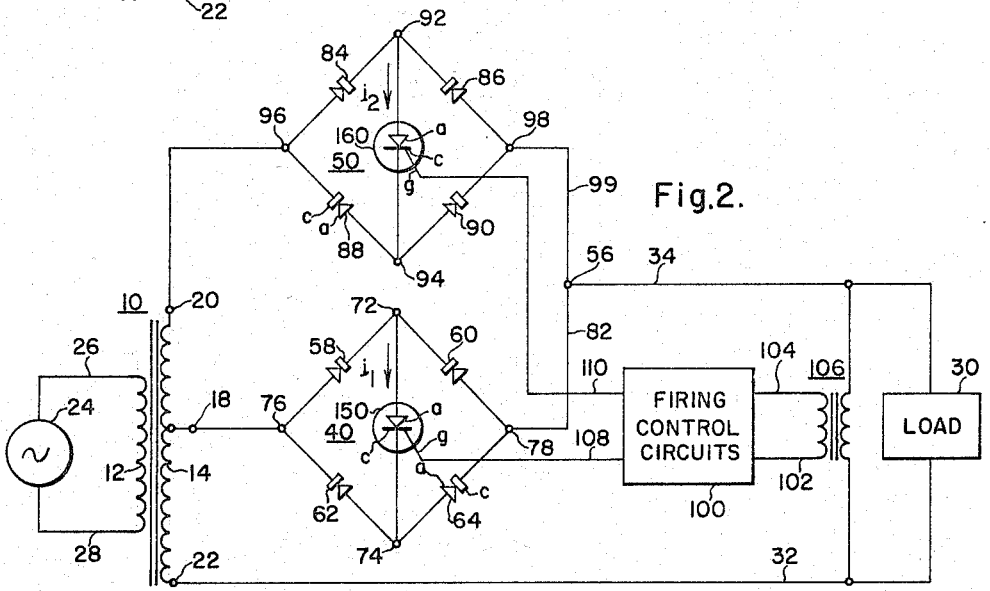
FIGURE 2 is a schematic diagram illustrating another embodiment of the invention.

The invention is not limited to the use of ignitrons as the controlled electrical valve. For example, FIG. 2 illustrates the principles of the invention utilizing a semiconductor controlled rectifier across the bridge rectifier circuit. Like components in FIG. 2 are indicated with like reference numerals, with the only change in FIG. 2 being the substitution of the semiconductor controlled rectifiers 150 and 160. Semiconductor controlled rectifiers, such as silicon controlled rectifiers, having an anode $a$, cathode $c$ and control electrode or gate $g$, have the characteristic of blocking the flow of forward current when forward voltage is applied to the device, until the forward breakover voltage is reached. At that point the device switches into a conducting state with very little voltage drop. The forward voltage at which the device will become conductive may be substantially reduced by applying a firing pulse between the gate and cathode electrodes. Once the control electrode is fired by a pulse and the pulse removed, conduction will be maintained until the anode-cathode current falls below a sustaining value, such as by going through zero during current reversal. Thus, the semiconductor controlled rectifiers 150 and 160 act very similar to the ignitrons 42 and 52 described in FIG. 1. Firing control circuits which will deliver firing pulses to the gate electrodes $g$ of controlled rectifiers 150 and 160 in response to some electrical quantity that is to be controlled, are well known in the art. For example, the firing control circuit described in copending application Serial No. 209,513, filed July 13, 1962, would be suitable.

In operation, the circuit shown in FIG. 2 will function in the same or similar manner as the circuit shown in FIG. 1 and hereinbefore described. In other words, forward voltage or voltage having a polarity such that the anode electrode is more positive than the cathode electrode, will be applied to semiconductor controlled rectifiers 150 and 160 during both the positive and negative alternations of the supply voltage 24. Therefore, only one controlled rectifier is required per tap, per electrical phase. On the positive half cycle of supply voltage 24, a firing pulse will be applied to the gate electrode $g$ of controlled rectifier 150, connecting tap connection 18 of winding 14 to load circuit 30 through diode 58, controlled rectifier 150 and diode 64. At a controlled time later during the positive half cycle, the firing circuits 100 will apply a firing pulse to the gate of electrode $g$ of controlled rectifier 160, connecting terminal connection 20 with the load circuit 30 through diode 84, controlled rectifier 160 and diode 90. As the voltage across load circuit 30 and at terminal 78 of rectifier bridge 40 starts to increase to the voltage of terminal connection 20, a point is reached where the voltage across terminals 76 and 78 of bridge rectifier 40 is insufficient to sustain the magnitude of current necessary to keep controlled rectifier 150 in a conducting state. Thus, the firing of controlled rectifier 160 automatically causes controlled rectifier 150 to cease conduction. At the end of the positive half cycle, controlled rectifier 160 also ceases conduction and a firing pulse is applied to the gate electrode $g$ of controlled rectifier 150 at the start of the negative half cycles. Tap connection 18 of winding 14 is connected to load circuit 30 during the first portion of the negative voltage half cycle through diode 60, controlled rectifier 150 and diode 62. At a point during the negative voltage half cycle determined by the firing control circuits 100, a firing pulse is applied to the gate electrode $g$ of controlled rectifier 160, connecting terminal connection 20 to load circuit 30 through diode 86, controlled rectifier 160 and diode 88, therefore automatically disconnecting tap connection 18 by rendering controlled rectifier 150 non-conducting. At the end of the negative half cycle, controlled rectifier 160 will become non-conductive and the cycle hereinbefore described is ready to repeat itself.

It will, therefore, be apparent that there has been disclosed a new and improved electronic tap changer system whereby only one electrical valve is required per tap connection, per electrical phase. The same electrical valve being utilized on both the positive and negative half cycles of the applied voltage. This circuit arrangement may conveniently be used with associated firing circuits to control an electrical quantity by providing an average electrical quantity, as determined by the firing point during the half cycle that the higher tap voltage is connected to the load circuit. Other advantages of the disclosed invention are the lower initial cost due to the reduced number of electrical valves and associated control circuitry required, the reduction in physical space required by the tap changing equipment and the reduction in maintenance required because of the fewer number of circuit components and control circuits.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense. For example, it will be obvious that although a two winding transformer 10 is illustrated in FIGS. 1 and 2, the tap changer system disclosed is equally applicable to other types of inductive apparatus such as auto transformers, and buck and boost auxiliary transformers which add a voltage to, or subtract a voltage from, a main transformer voltage, or any other situation which requires the switching of alternating potential circuits.

I claim as my invention:

1. A tap changer system comprising an alternating potential source, an alternating potential load, means including an inductive winding having tap connections thereon connected in circuit relation with said alternating potential source and said alternating potential load, rectifier means connected in circuit relation with certain of said tap connections and said alternating potential load, and electrical valves connected in circuit relation with each of said rectifier means such that the polarity of the potential applied to said electrical valve is the same during the positive and negative alternations of said alternating potential source, and means transferring the load current from an electrical valve associated with a tap connection of lower potential to an electrical valve associated with a tap connection of higher potential at any point in the positive and negative alternations of said alternating potential source.

2. A tap changer system comprising an alternating potential source, an alternating potential load, means including an inductive winding having tap connections thereon connected in circuit relation with said alternating potential source and said alternating potential load, bridge rectifier means connected in circuit relation with certain of said tap connections and said alternating potential load, a controlled electrical valve connected in circuit relation with each of said bridge rectifier means such that the polarity of the potential applied to said controlled electrical valve is the same during the positive and negative alternations of said alternating potential source, and control means transferring the load current from a controlled electrical valve associated with a tap connection of lower potential to a controlled electrical valve associated with a tap connection of higher potential at any point in the positive and negative alternations of said alternating potential source.

3. A tap changing system comprising an inductive winding having tap connections thereon, an alternating potential source connected in circuit relation with said inductive winding, an alternating potential load circuit, rectifier means connected in circuit relation with certain of said tap connections and said alternating potential load circuit, controlled rectifier means connected in circuit relation with each of said rectifier means such that said controlled rectifier means is poled in the conducting direction during the positive and negative alternations of said alternating potential source, and control means transferring the load current from one controlled rectifier to a controlled rectifier associated with a tap connection of higher potential at a point during the positive and negative alternations of said alternating potential source.

4. A tap changing system comprising inductive apparatus including a winding having tap connections thereon, an alternating potential source connected in circuit relation with said inductive apparatus, an alternating potential load circuit, a bridge rectifier connected in circuit relation with certain of said tap connections and said alternating potential load circuit, controlled rectifier means connected in circuit relation with each of said bridge rectifiers such that said controlled rectifier means is poled in the conducting direction during the positive and negative alternations of said alternating potential source, and control means transferring the load current from one controlled rectifier to a controlled rectifier associated with a tap connection of higher potential at a point during the positive and negative alternations of said alternating potential source.

5. A regulating system for regulating a certain electrical quantity comprising an alternating potential source, an alternating potential load circuit, inductive apparatus including a winding having tap connections thereon, bridge rectifiers means connected in circuit relation with certain of said tap connections and said alternating potential load circuit, controlled rectifier means having cathode, anode and control electrodes, said controlled rectifier means being connected in circuit relation with said bridge rectifier means such that the anode and cathode electrodes are poled in the conducting direction during the positive and negative alternations of said alternating potential source, and control means connected in circuit relation with said alternating potential load circuit, said control means applying pulses to the control electrodes of said controlled rectifier means such that load current is transferred from one controlled rectifier to a controlled rectifier associated with a tap connection of higher potential at a point during the positive and negative alternations of said alternating potential source to maintain the electrical quantity to be regulated at a predetermined average value.

6. A regulating system for regulating a certain electrical quantity comprising an alternating potential source, an alternating potential load circuit, inductive apparatus including a winding having tap connections thereon, a bridge rectifier connected in circuit relation with certain of said tap connections and said alternating potential load circuit, controlled rectifier means having cathode, anode and control electrodes, the anode and cathode electrodes of said controlled rectifier means being connected in circuit relation with said bridge rectifier means such that said controlled rectifier means is poled in the conducting direction during the positive and negative alternations of said alternating potential source, and control means connected in circuit relation with said alternating potential load circuit, said control means applying pulses to the control electrodes of said controlled rectifier means such that a pulse is applied to the control electrodes of one of said controlled rectifiers at the start of each half cycle of said alternating potential source and a pulse is applied to the control electrode of a controlled rectifier associated with a tap connection of higher potential at a point during the voltage half cycle to thereby switch the load current between taps of said winding and maintain the electrical quantity to be regulated at a predetermined average magnitude.

References Cited by the Examiner

UNITED STATES PATENTS

| 3,040,239 | 6/1962 | Walker | 323—24 |
| 3,080,516 | 3/1963 | Bixby et al. | 323—22 |
| 3,156,860 | 11/1964 | Paynter | 323—43.5 X |
| 3,195,036 | 7/1965 | McNulty | 323—43.5 X |
| 3,202,899 | 8/1965 | Gambill et al. | 323—22 X |

JOHN F. COUCH, *Primary Examiner.*

LLOYD McCOLLUM, *Examiner.*

W. E. RAY, *Assistant Examiner.*